(12) United States Patent
Nozaki

(10) Patent No.: US 6,470,267 B1
(45) Date of Patent: Oct. 22, 2002

(54) MAN NAVIGATION SYSTEM

(75) Inventor: Takashi Nozaki, Tokyo (JP)

(73) Assignee: Pioneer Corporation, Increment P Corporation, Tokyo (JP)

( * ) Notice: Subject to any disclaimer, the term of this patent is extended or adjusted under 35 U.S.C. 154(b) by 0 days.

(21) Appl. No.: 09/665,129

(22) Filed: Sep. 20, 2000

(30) Foreign Application Priority Data

Sep. 20, 1999 (JP) ............................................ 11-265225

(51) Int. Cl.$^7$ ............................................ G06F 165/00
(52) U.S. Cl. ...................................... 701/209; 701/210
(58) Field of Search ......................... 701/209, 210–213; 340/990, 998

(56) References Cited

U.S. PATENT DOCUMENTS

| | | | |
|---|---|---|---|
| 5,802,492 A | | 9/1998 | DeLorme et al. ............ 701/200 |
| 5,944,769 A | | 8/1999 | Musk et al. ................ 701/201 |
| 5,978,732 A | * | 11/1999 | Kakitani et al. ............ 701/209 |
| 6,014,607 A | * | 1/2000 | Yagyu et al. ............... 340/990 |
| 6,034,626 A | * | 3/2000 | Maekawa et al. ........... 701/209 |
| 6,041,281 A | * | 3/2000 | Nimura et al. .............. 701/211 |
| 6,047,280 A | * | 4/2000 | Ashby et al. ............... 701/709 |
| 6,052,645 A | * | 4/2000 | Harada ........................ 340/990 |
| 6,064,941 A | * | 5/2000 | Nimura et al. .............. 701/209 |

FOREIGN PATENT DOCUMENTS

| | | |
|---|---|---|
| DE | 0 715 289 A2 | 6/1996 |
| EP | 0 372 840 A | 6/1990 |
| EP | 0 703 433 A1 | 3/1996 |
| EP | 0 770 979 A1 | 5/1997 |

\* cited by examiner

Primary Examiner—Richard M. Camby
(74) Attorney, Agent, or Firm—Sughrue Mion, PLLC

(57) ABSTRACT

A man navigation system comprises a map display device for retrieving map data on a required area from a database and displaying a map image based on the retrieved map data, a point specifying device for optionally specifying a first point and a second point in the map image displayed by the map display device, a condition setting device for setting a condition for route setting, a route setting device for setting a route connecting the first point and the second point in the map image specified by the point specifying device based on the condition set by the condition setting device, and a route display device for displaying the route set by the route setting device on the map image displayed by the map display device.

18 Claims, 9 Drawing Sheets

MAN NAVIGATION SYSTEM

BACKGROUND OF THE INVENTION

The present invention relates to a system for displaying a route from a start point to a destination in a map image read from a database and displayed, thereby navigating people.

In recent years, a map information retrieving display system such as an electronic dictionary for map information developed for an information retrieving equipment and a server for map information provision connected to internet has been improved with the spread of the information retrieving equipment such as a microcomputer and the rapid expansion of an information providing service to be provided through the internet.

The map information retrieving display system is utilized by inputting a land mark such as an address or the name of facilities, retrieving map data on a desirable area from an electronic dictionary set up to the information retrieving equipment and a database of a server for map information provision which is connected through the internet, and displaying a map image of the map data in a display section and printing the map image.

The present applicant has proposed a route information providing system for displaying the shortest route connecting a starting point and a destination which are specified on a map image through map data on a desirable area retrieved from the database in the prior application (JP-A-10-102512).

The route information providing system previously stores route information in route computing database, carries out route computation based on the route information retrieved from the route computing database when the JR Kamata Station is specified as a starting point S and the Keikyu Kamata Station is specified as a destination G on a map image shown in FIG. 10, for example, displays the shortest route L giving priority to a highway connecting the starting point Sand the destination G together with character data indicative of a total distance through a coloring (road coloring) method, thereby navigating people.

Thus, the route information providing system in the prior proposal has an excellent feature that a user can easily get the route information indicative of the shortest route from the starting point to the desirable destination.

However, the user wants to select a route capable of achieving a desirable object on the route from the starting point to the destination in place of the shortest route depending on circumstances.

For example, the user wants to take a meal, do shopping or do things in a banking agency during a movement from the starting point to the destination and a store for this purpose is not positioned along a highway but on a back street in some cases.

In some cases, moreover, the user wants to select a route to the destination depending on circumstances such as a weather.

The user's requests are varied depending on various causes such as the user's age, sex and hobby, and is changed depending on circumstances such as a day of the week, a time zone or a weather.

On the other hand, commercial utilization has recently been extended with the recent spread of the map information retrieving display system. For the route information providing system, similarly, usefulness of an advertisement medium has been acknowledged increasingly, for example.

SUMMARY OF THE INVENTION

The invention has been made to meet the user's demand for the route information providing system.

More specifically, it is an object of the invention to provide a man navigation system capable of displaying a route meeting the user's demand and of being utilized as an advertisement medium when displaying a route connecting a specified starting point to a destination as a map image to navigate people.

In order to achieve the object, a first aspect of the invention is directed to a man navigation system comprising map display means for retrieving map data on a required area from a database and displaying a map image based on the retrieved map data, point specifying means for optionally specifying a first point and a second point in the map image displayed by the map display means, condition setting means for setting a condition for route setting, route setting means for setting a route connecting the first point and the second point in the map image specified by the point specifying means based on the condition set by the condition setting means, and route display means for displaying the route set by the route setting means on the map image displayed by the map display means.

In the man navigation system according to the first aspect of the invention, a route connecting the first point and the second point which is optionally specified by the point specifying means, that is, a starting point and a destination which is set by the route setting means based on the condition set by the condition setting means is displayed by the route display means on the map image displayed by the map display means.

For example, in the case in which the condition setting means is to set a route set condition based on user information including a user's sex, age, character, hobby and preference, the route setting means sets a route to pass through a store corresponding to the user's hobby. Moreover, in the case in which the condition setting means is to set, as a route set condition, at least one condition such as a time and time zone that the user utilizes the route connecting the first point and the second point, a weather, a season or a climate, route setting is carried out corresponding to various route setting conditions, for example, a route in which an arcade is provided or a route passing through large facilities is set.

The user can display the route set corresponding to the route setting condition on the map image displayed on a display such as a terminal equipment, thereby receiving navigation while seeing the displayed route.

According to the first aspect of the invention, when the route connecting the specified first point (starting point) and second point (destination) is to be displayed on the map image to navigate a man, the shortest route is not simply set but the route is set corresponding to a condition set for each user, for example, the user's hobby or depending on a time zone for utilization and a weather. Therefore, a route to meet the user's demand can be set for navigation at each time. In addition, when specific facilities are to be set as the route setting condition, for example, the facilities can be specified for an advertisement provider. Thus, the man navigation system can also be utilized as an advertisement medium.

In order to achieve the object, in addition to the structure of the first aspect of the invention, a second aspect of the invention is directed to the man navigation system wherein the condition setting means sets a route setting condition based on user information including a user's sex, age, character, hobby and preference.

In the man navigation system according to the second aspect of the invention, a route passing through facilities such as a store dealing in goods adapted to the user's sex, age and hobby, for example, is set based on user information which is previously registered or is input during route setting.

According to the second aspect of the invention, therefore, when the route connecting the specified first point (starting point) and second point (destination) is to be displayed on the map image to navigate a man, the shortest route is not simply set but a route corresponding to each user's preference is set. Consequently, the navigation can be carried out while guiding the user to a more useful route. Thus, a new discovery of the area can be given to the user. Furthermore, commercial utilization such as an increase in a purchasing will can also be obtained.

In order to achieve the object, in addition to the structure of the second aspect of the invention, a third aspect of the invention is directed to the man navigation system wherein the user information is previously recorded in a user registration database and the condition setting means sets the route setting condition by reading the user information from the user registration database.

According to the man navigation system in accordance with the third aspect of the invention, the route setting condition is set by the condition setting means based on the user information previously recorded in the user registration database.

Accordingly, the user can automatically receive the navigation through the man navigation system according to a route meeting the user's preference based on the user information read from the user registration database.

In order to achieve the object, in addition to the structure of the first aspect of the invention, a fourth aspect of the invention is directed to the man navigation system wherein the condition setting means sets, as the route setting condition, at least one condition such as a time and time zone that the user utilizes the route connecting the first point and the second point, a weather, a season or a climate.

In the man navigation system according to the fourth aspect of the invention, a route is set based on at least one condition such as a time and time zone, a weather, a season or a climate when the user is to receive the navigation.

For example, in the case in which the time and time zone that the user is to receive the navigation is a time for a meal, it is possible to set a route passing through a restaurant or passing without getting wet in the rain if any.

According to the fourth aspect of the invention, therefore, when the route connecting the specified first point (starting point) and second point (destination) is to be displayed on the map image to navigate a man, it is possible to navigate the man through a more useful route than the case in which the man is simply navigated through the shortest route.

In order to achieve the object, in addition to the structure of the second aspect of the invention, a fifth aspect of the invention is directed to the man navigation system wherein the route setting means has facility information database storing information about facilities positioned in the map image displayed by the map display means, retrieves the facilities corresponding to the user information from the facility information database, and selects a route including the retrieved facilities as a set route.

In the man navigation system according to the fifth aspect of the invention, when the route setting means is to set a route based on the user information in the second aspect of the invention, facilities corresponding to the user information are retrieved from the facility information database previously storing information about facilities positioned in the map image.

According to the fifth aspect of the invention, therefore, the facilities corresponding to the user information can be retrieved easily and the facilities having information stored in the facility information database are set to have advertisement provision. Consequently, the man navigation system can also be utilized as an advertisement medium.

In order to achieve the object, in addition to the structure of the fourth aspect of the invention, a sixth aspect of the invention is directed to the man navigation system wherein the route setting means has facility information database storing information about facilities positioned in the map image displayed by the map display means, retrieves, from the facility information database, the facilities corresponding to at least one condition such as the time and time zone, the weather, the season or the climate which is set as the route setting condition by the condition setting means, and selects a route including the retrieved facilities as a set route.

In the man navigation system according to the sixth aspect of the invention, when the route setting means is to set a route based on the condition such as a time for utilization of navigation or a weather in the fourth aspect of the invention, facilities adapted to the condition are retrieved from the facility information database previously storing information about the facilities positioned in the map image.

According to the sixth aspect of the invention, therefore, the facilities adapted to the time for utilization and the weather can be retrieved easily and the facilities having information stored in the facility information database are set to have advertisement provision, for example. Consequently, the man navigation system can also be utilized as an advertisement medium.

In order to achieve the object, in addition to the structure of the fifth or sixth aspect of the invention, a seventh aspect of the invention is directed to the man navigation system wherein the facility information stored in the facility information database is recorded based on a request of an advertisement provider.

According to the man navigation system in accordance with the seventh aspect of the invention, the route setting means sets a route based on a position where the facilities of an advertisement provider are located. Consequently, the advertisement provider can utilize the man navigation system as an advertisement medium. Thus, the man navigation system can be increasingly utilized commercially.

In order to achieve the object, in addition to the structure of the first aspect of the invention, an eighth aspect of the invention is directed to the man navigation system wherein the route setting means has a route database storing information about a route on the map image displayed by the map display means and sets a route based on the route information retrieved from the route database.

In the man navigation system according to the eighth aspect of the invention, the route database stores information about a route on the map image. When the route setting means is to set a route based on the route setting condition, it retrieves, from the route database, information about a route to be set, for example, information such as the presence of an arcade, positions of entrances and exits of large facilities, identification of right and left of a sidewalk provided on both sides of a road and the position of a crosswalk.

According to the eighth aspect of the invention, therefore, it is possible to set a fine route which is more adapted to conditions such as user information or a weather.

In order to achieve the object, in addition to the structure of the eighth aspect of the invention, a ninth aspect of the invention is directed to the man navigation system wherein the route information stored in the route database is related to presence of an arcade.

According to the man navigation system in accordance with the ninth aspect of the invention, for example, in the case in which the route setting means is to set a route as the route setting conditions, a road having an arcade provided thereover is selected to set a route in case of the rain. Consequently, it is possible to carry out navigation to guide the user to such a route as not to get wet in the rain.

In order to achieve the object, in addition to the structure of the eighth aspect of the invention, a tenth aspect of the invention is directed to the man navigation system wherein the route information stored in the route database is related to positions of entrances and exits of large facilities.

According to the man navigation system in accordance with the tenth aspect of the invention, for example, in the case in which the route setting means is to set a route by using the weather as the route setting condition, it sets a routs passing through large facilities in which an umbrella is not required in case of the rain or fair midsummer and provide a cool state through high air-conditioning. Consequently, it is possible to carry out navigation to guide the user to a more useful route than a movement in the shortest distance.

In order to achieve the object, in addition to the structure of the eighth aspect of the invention, an eleventh aspect of the invention is directed to the man navigation system wherein the route information stored in the route database is related to a position of a sidewalk provided on both sides of a road.

According to the man navigation system in accordance with the eleventh aspect of the invention, for example, in the case in which the facilities adapted to the route setting condition such as user information face a road having a sidewalk provided on both sides, it is possible to carry out navigation through fine route setting capable of deciding which side of the sidewalk has the facilities and utilizing the facilities without the user crossing the road.

In order to achieve the object, in addition to the structure of the eighth aspect of the invention, a twelfth aspect of the invention is directed to the man navigation system wherein the route information stored in the route database is related to a position of a crosswalk provided on a road.

According to the man navigation system in accordance with the twelfth aspect of the invention, for example, in the case in which the user crosses the crosswalk, it is possible to carry out navigation through such fine route setting as to reach, at the shortest distance, the facilities in the crosswalk provided on the intersection which are adapted to the user information.

In order to achieve the object, in addition to the structure of the eighth aspect of the invention, a thirteenth aspect of the invention is directed to the man navigation system wherein the route display means displays the facilities retrieved from the facility information database to be distinguished from other facilities on the map image displayed by the map display means.

According to the man navigation system in accordance with the thirteenth aspect of the invention, for example, when the route setting is to be carried out in the fifth or sixth aspect of the invention, the facilities adapted to the user information retrieved as the route setting condition or the weather are displayed on the route set in the map image through expansion, coloring or flashing such that they can be distinguished from other facilities. Consequently, the user can utilize the facilities easily.

DETAILED DESCRIPTION OF THE PREFERRED EMBODIMENTS

An embodiment which seems to be the most suitable for the invention will be described below in detail with reference to the drawings.

Figure 1:
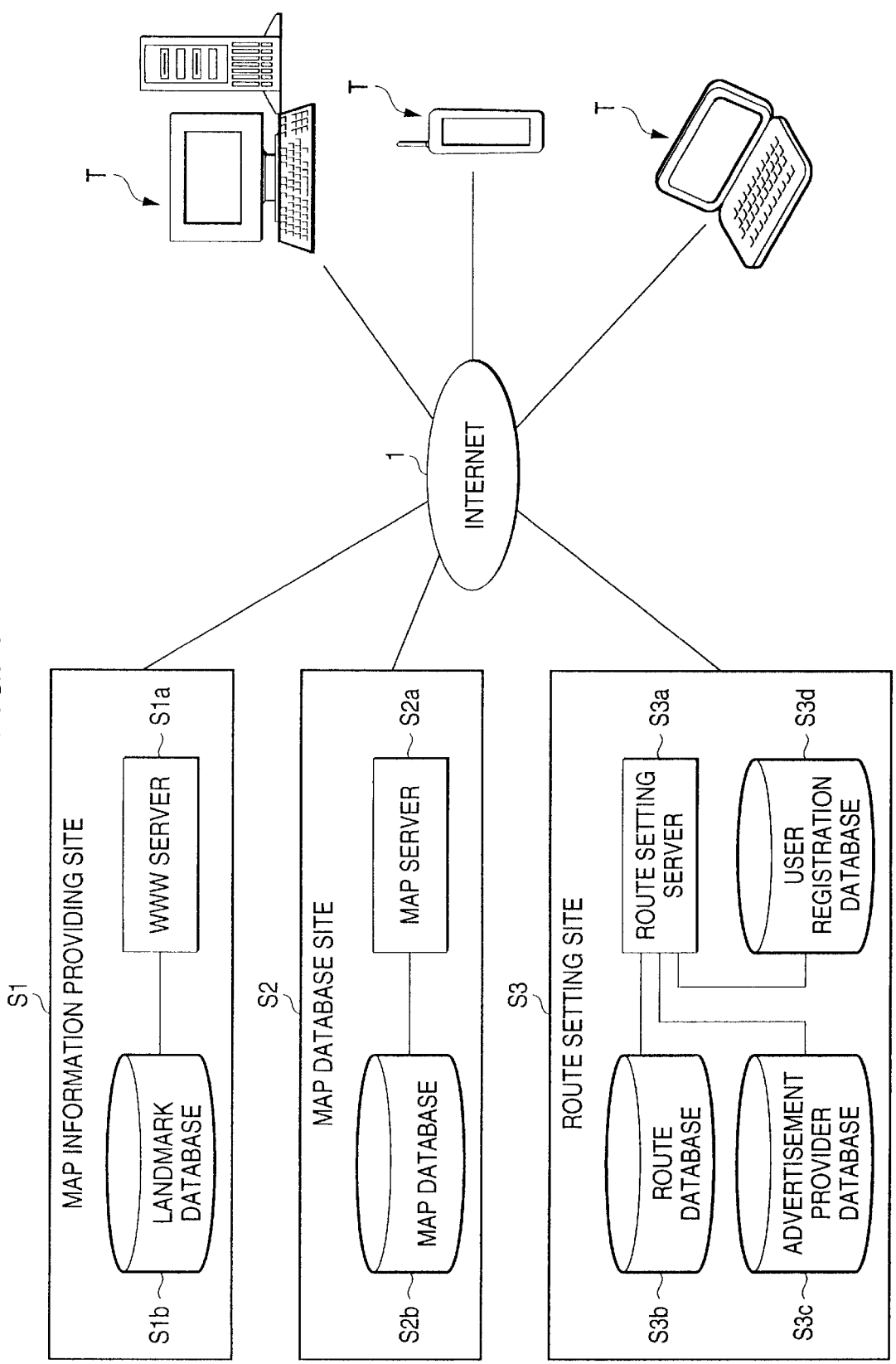
FIG. 1 is a diagram showing a structure of a man navigation system according to an embodiment of the invention.

FIG. 1 is a diagram showing a structure of a map information retrieving system according to an embodiment of the invention.

In FIG. 1, a terminal equipment T is connected to an internet I through a public telephone network and an access server which are not shown, and a map information providing side S1, a map information database site S2 and a route setting site S3 are connected to the internet I, respectively.

The map information providing site S1 serves to give a providing service for map information through a WWW (World Wide Web) and generalizes the information provision, to a terminal equipment T, from a map database site S2 and a route setting site S3 which will be described below.

The map information providing site S1 includes a WWW server S1$a$ and a land mark database S1$b$ storing a land mark such as an address or facilities and data indicative of their position information. The WWW server S1$a$ accesses the land mark database S1$b$ based on information input from the terminal equipment T, thereby specifying the landmark such as an address or facilities from the input position information or acquiring corresponding position information from the specified land mark, which will be described below.

The map database site S2 serves to give a retrieving display service for map information on the internet, and includes a map server S2$a$ for reading map data and transmitting the map data to the terminal equipment T and a map information database S2b storing position information indicative of coordinates through a latitude and a longitude, map display information such as a reduced scale or a map size and image data on a map corresponding to these information.

The route setting site S3 serves to set an optimum route adapted to the conditions set by each user in a route connecting a starting point and a destination which are specified by the user through the terminal equipment T, and includes a route setting server S3a storing a program for route setting, a route database S3b recording vector data indicative of a road on a map which are required for the route setting by the route setting server S3a, an advertisement provider database S3c recording registration data of an advertisement provider such as a store or a shop, and a user registration database S3d recording user information.

The route database S3b of the route setting site S3 stores all information about a road, for example, information about a road required for route setting such as the type of the road, for example, a general road, a special road for cars or a special road for pedestrians, the identification of right and left sidewalks provided on the road, the positions of a signal and a crosswalk at an intersection, the presence of an arcade and the positions of entrances and exits which face various roads in a large store, for example, a department store.

Figure 2:
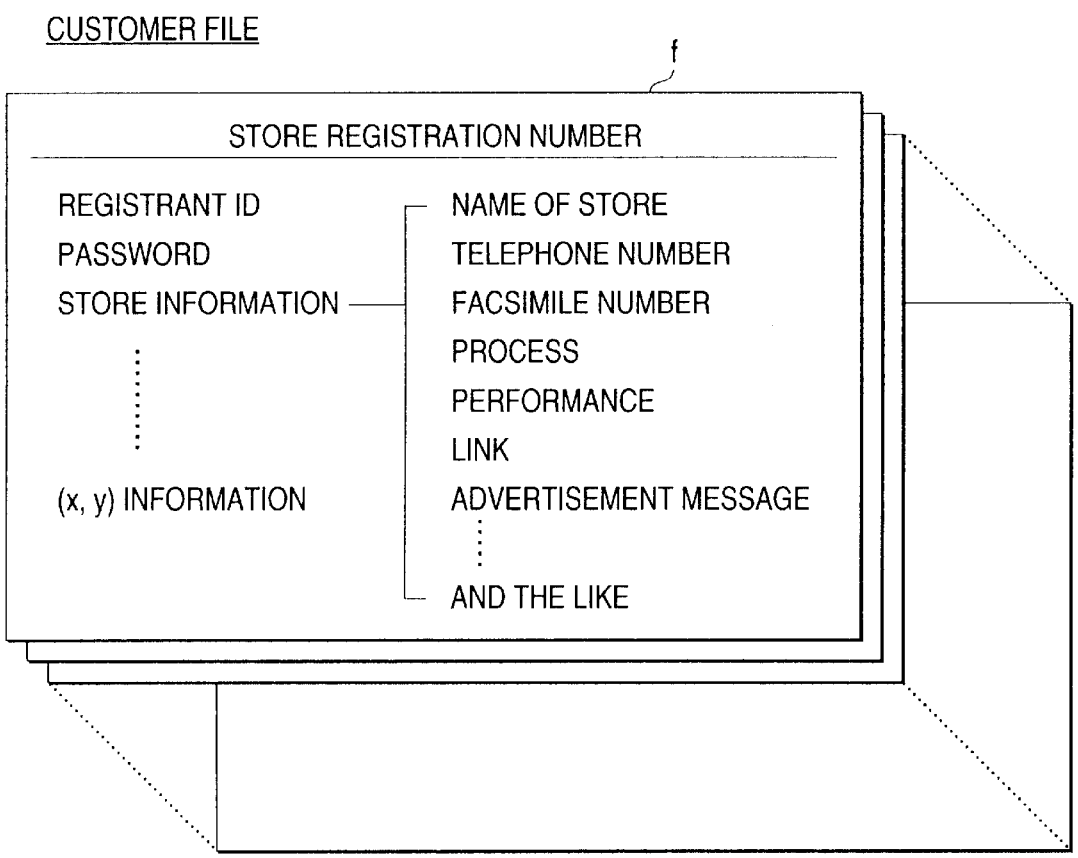
FIG. 2 is a diagram illustrating a customer file recorded in a user registration database according to the embodiment of the invention.

Moreover, the advertisement provider database S3c records registration data on an advertisement provider such as a store or shop association which provides an advertisement in the form of a customer file f shown in FIG. 2. The customer file f records, for each advertisement provider, data on a position of a store on a map required for the route setting carried out by the route setting server S3a, a type of industry, goods to be dealt and a business hour, which will be described below.

The user registration database 53d records, for each user, information which utilizes the man navigation system and is previously registered, for example, information required for the route setting such as a sex, an age, a hobby, a preference and a hometown.

The terminal equipment T is a user terminal capable of receiving a WWW service by using an application program referred to as a WWW browser.

For the terminal equipment T, a portable telephone having a so-called i mode function and PDA (Personal Digital Assistants) including a portable terminal such as a mobile are used in addition to a personal computer.

Figure 3:
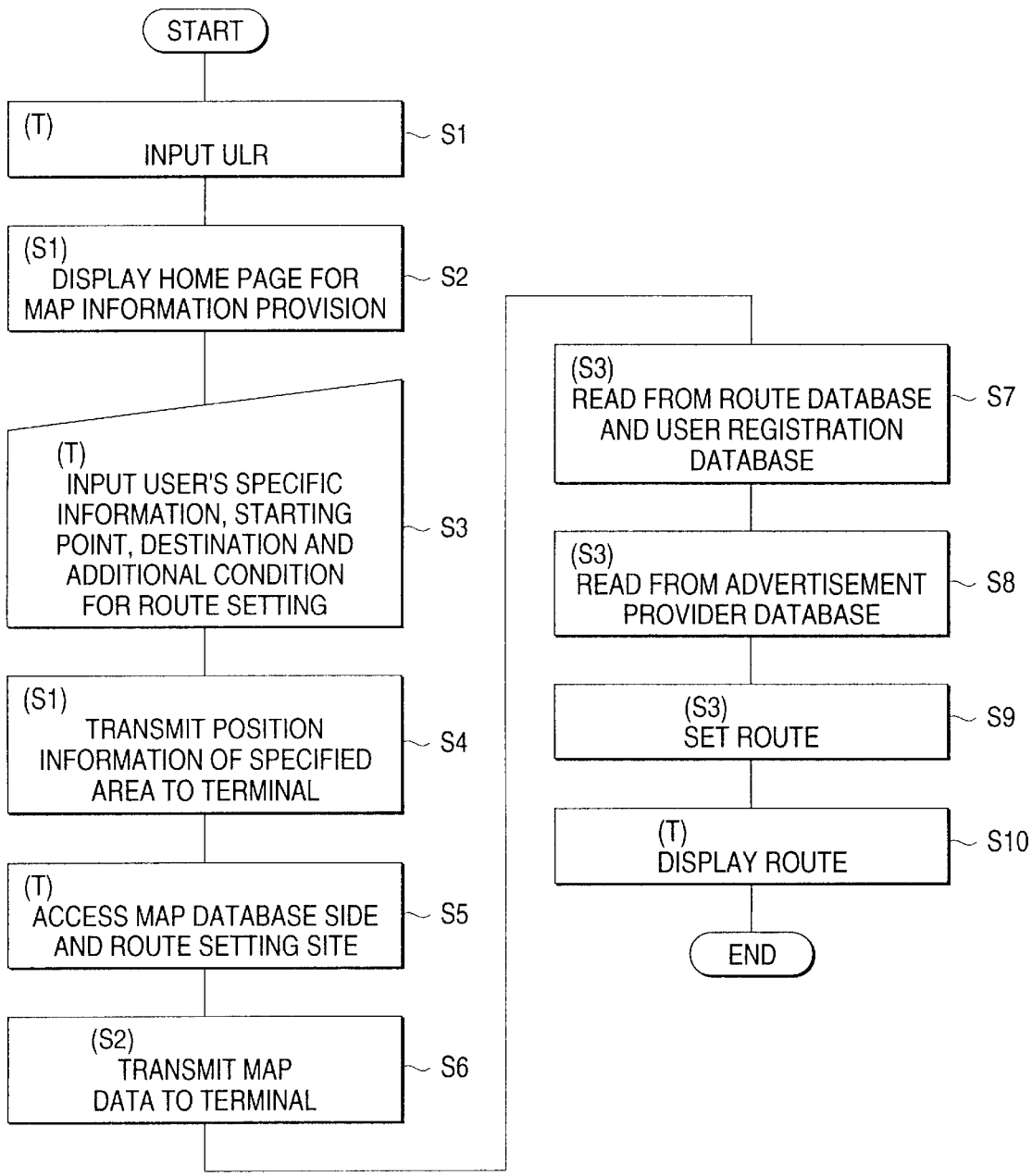
FIG. 3 is a flow chart showing an example of a route setting procedure according to the embodiment of the invention.

Next, a method of retrieving a route through the man navigation system will be described with reference to a flow chart shown in FIG. 3.

First of all, a user which wants to receive the provision of navigation information from the man navigation system connects the terminal equipment T to the internet I through a public telephone network and an access server, and specifies a URL (Uniform Resource Locator) of the map information providing site S1 through the WWW browser set up to the terminal equipment T (Step s1).

The map information providing site S1 transmits, to the terminal equipment T, an image through a HTML (HyperText Makeup Language) text of a home page for providing navigation information and displays the image based on the specification of the URL through the terminal equipment T (Step s2).

Next, the user inputs an ID and a password for specifying the user on the home page displayed on a display of the terminal equipment T and specifies a starting point and a destination which are to be navigated (Step s3).

At the Step 33, moreover, if there are additional conditions for the route setting, for example, conditions other than set conditions included in the user information which are previously registered on the user registration database S3d of the route setting site S3 such as a time, a weather and an item to be required (meals or shopping) for the passage through a set route, the same condition is input.

At the map information providing site S1, the WWW server S1a acquires, from the land mark database S1b, position (coordinate) information about an area including a starting point and a destination which are specified through the land mark database S1b specified in the terminal equipment T based on information about the starting point and the destination, and creates an HTML text indicative of the URLs of the map data base site S2 and the route setting site S3 which have the position (coordinate) information and data on a map image corresponding thereto and transmits the HTML text to the terminal equipment T (Step s4).

The terminal equipment T accesses the map database site S2 and the route setting site S3 based on the information received from the map information providing site S1 (Step s5).

At the map database site S2, the map server S2a acquires, from the map information database S2b, map data on an area corresponding to the position information received from the map information providing site S1 through the terminal equipment T and transmits the map data to the terminal equipment T (Step s6).

On the other hand, at the route setting site S3, the route setting server S3a reads, from the route database S3b, route data on a road connecting the starting point and the destination which are specified in the terminal equipment T and reads a user file recorded on the user registration database S3d based on the user's specific information input through the terminal equipment T (Step s7).

Furthermore, if the route setting conditions such as the user's age, sex and hobby which are recorded on the user file read from the user registration database S3d and the additional conditions are input through the terminal equipment T, a customer file f for an advertisement provider which is adapted to the additional conditions is read from the advertisement provider database S3c at the route setting site S3 (Step s8).

The route setting server S3a sets an optimum route adapted to the user set conditions in the route connecting the user specified starting point and destination based on the route data read from the route database S3b and the customer file f for the advertisement provider read from the advertisement provider database S3c as described above according to a stored program for the route setting, and transmits the route information to the terminal equipment T (Step s9).

A route setting manner in the route setting server S3a will be described below in detail.

The terminal equipment T displays a map image on the display based on map data transmitted from the map database site S2 and displays a route set between the starting point and the destination on the displayed map image through coloring (road coloring) based on the route information transmitted from the route setting site S3 (Step s10)

Next, the route setting manner at the Step s9 will be described based on examples shown in FIGS. 4 to 9.

Figure 4:
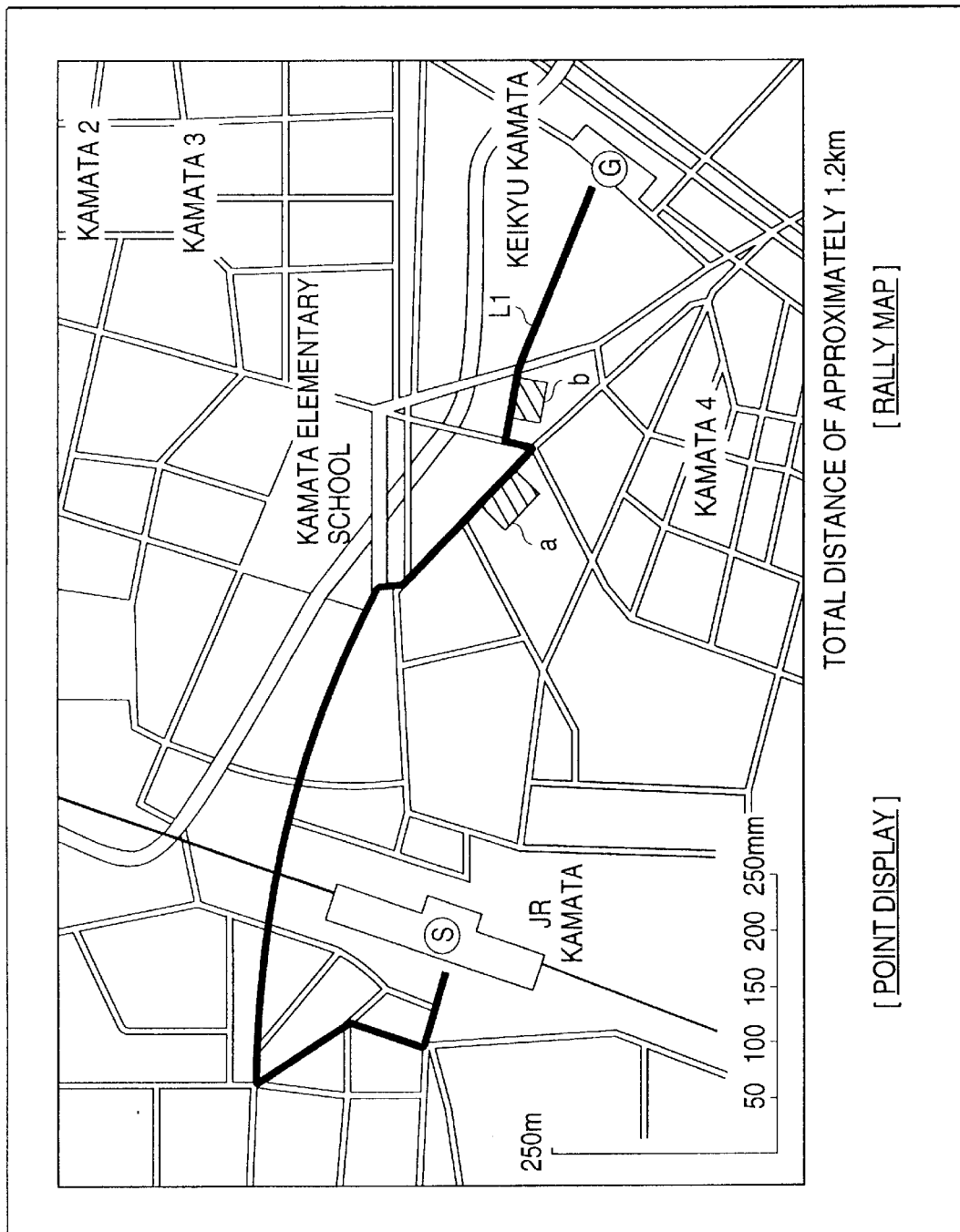
FIG. 4 is a diagram illustrating an example of a screen displaying a result of route setting according to the invention.
Figure 5:
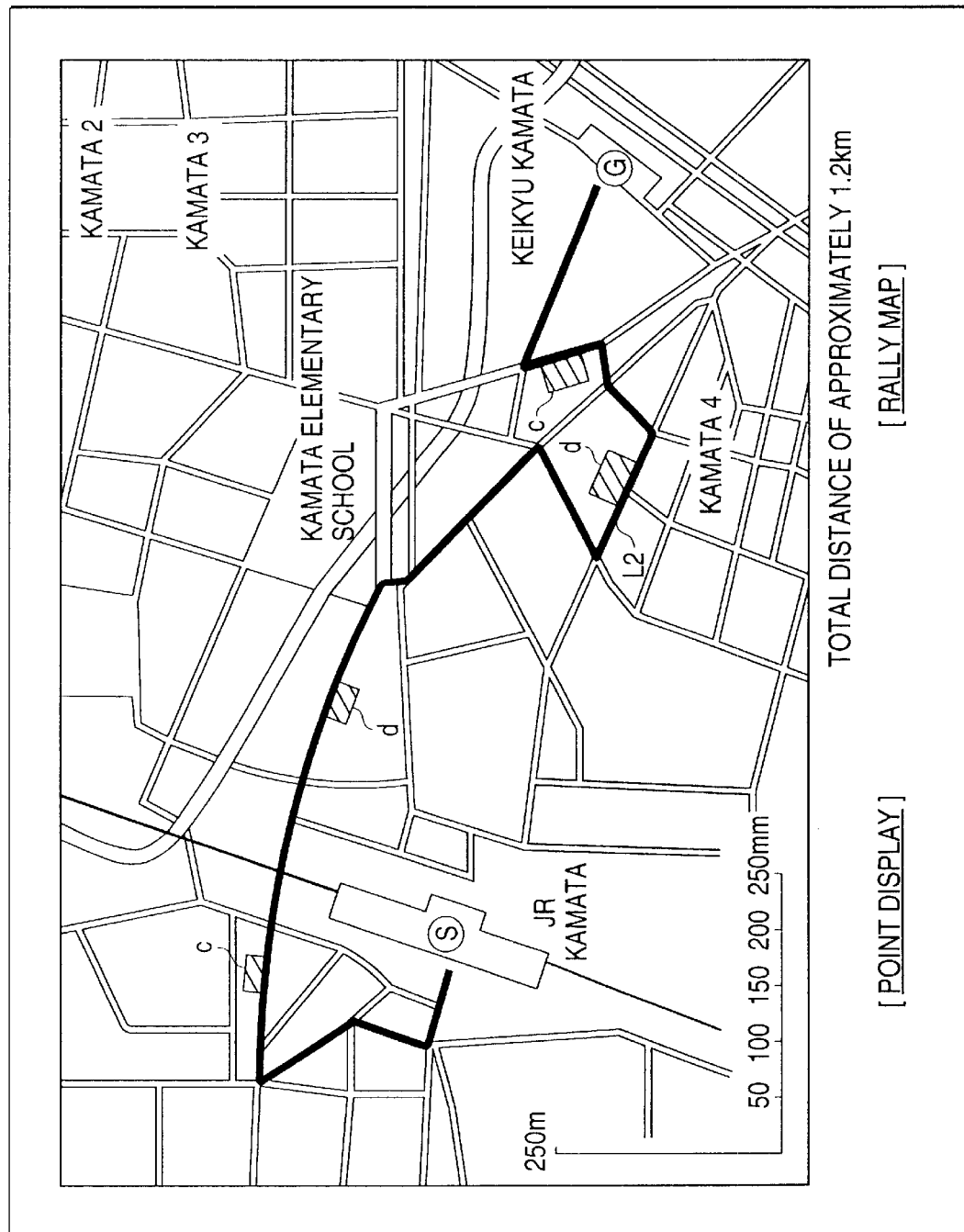
FIG. 5 is a diagram illustrating another example of the screen displaying the result of the route setting according to the invention.

FIGS. 4 and 5 show the case in which a route adapted to the user's sex, age and hobby is set based on the user information registered on the user registration database S3d of the route setting site S3.

More specifically, as shown in FIG. 4, in the case in which the user is a woman and loves jewelry and clothes, a jewelry store a and a boutique b between a starting point S and a destination G which are specified are picked up from jewelry stores and boutiques which are registered on the advertisement provider database S3c and the shortest route L1 passing through the jewelry store a and the boutique b is set.

If the user's hobby is reading, a book store c between the starting point S and the destination G which is specified is picked out from book stores registered on the advertisement provider database 3c as shown in FIG. 5. Furthermore, if the user is young, a registered convenience store d selling magazines is also picked up and the shortest route L2 passing through the book store c and the convenience store d is set.

Figure 6:
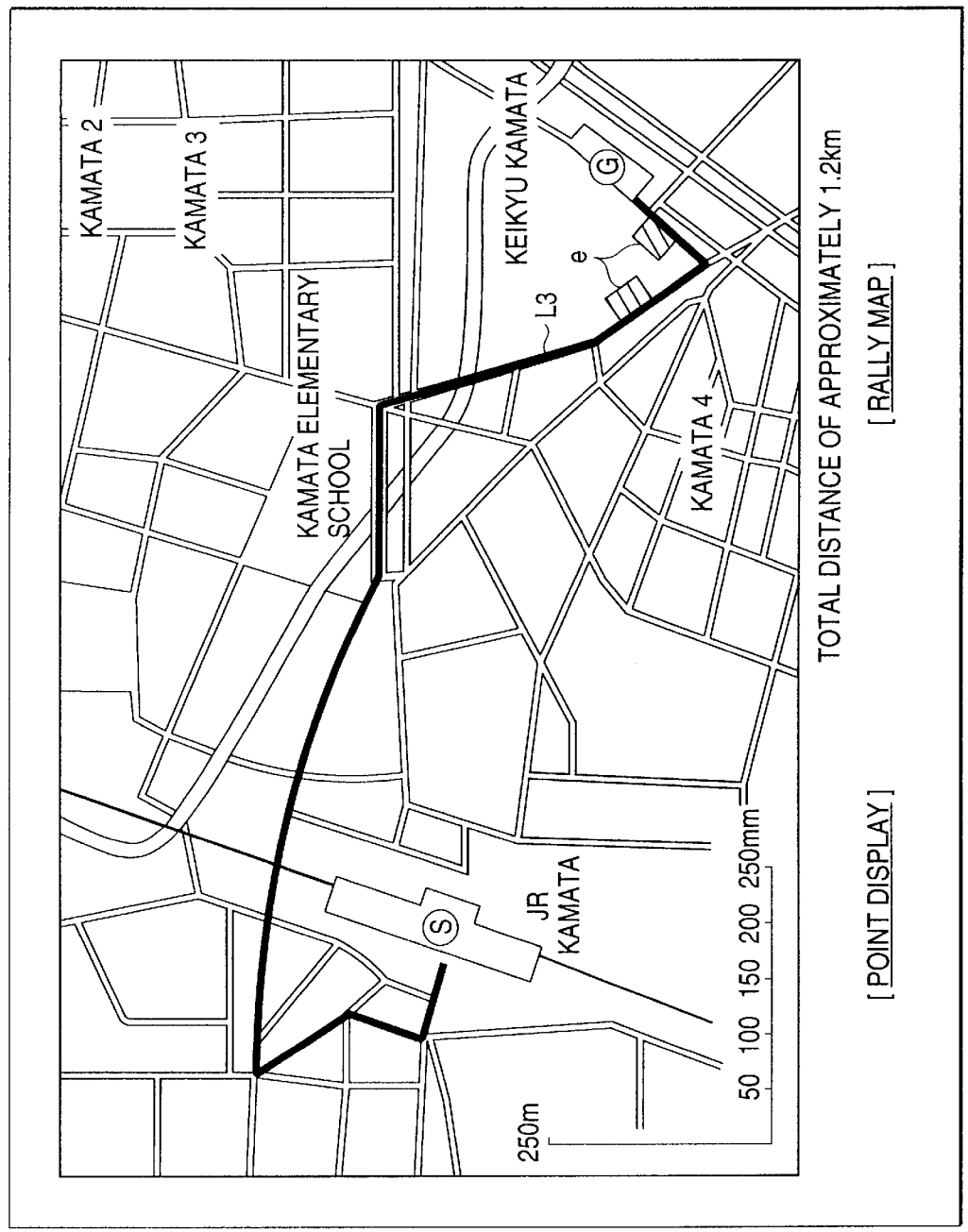
FIG. 6 is a diagram illustrating yet another example of the screen displaying the result of the route setting according to the invention.
Figure 7:
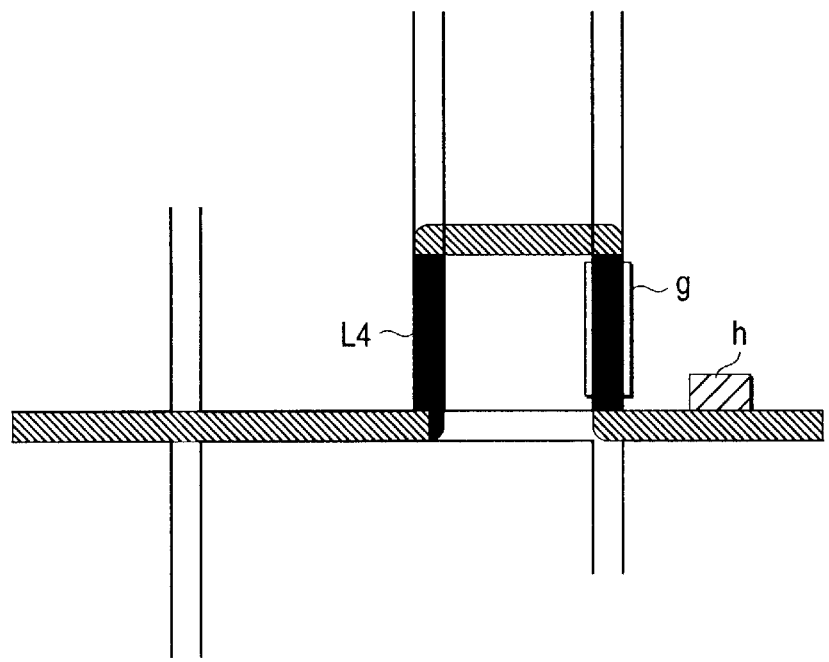
FIG. 7 is a diagram illustrating a further example of the screen displaying the result of the route setting according to the invention.
Figure 8:
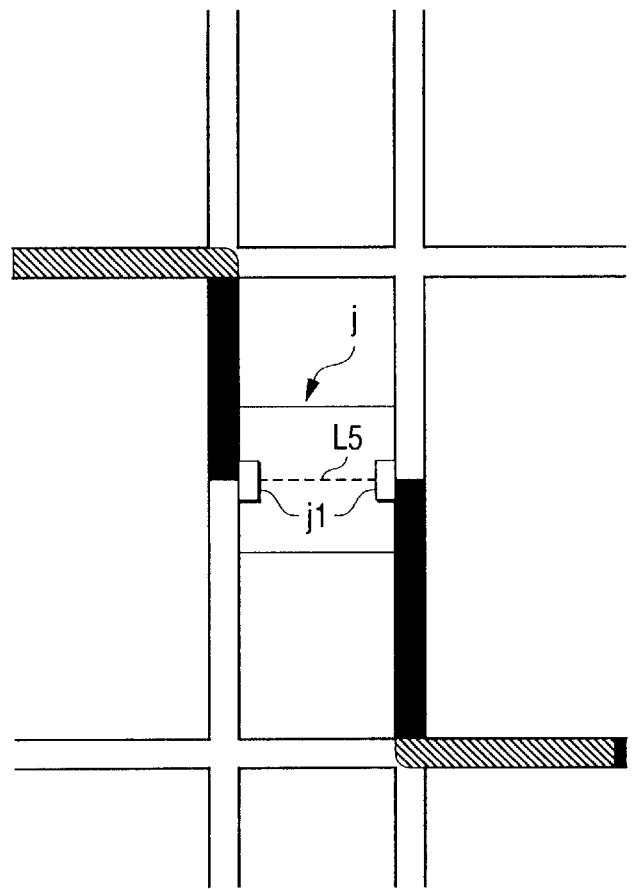
FIG. 8 is a diagram illustrating a further example of the screen displaying the result of the route setting according to the invention.

FIGS. 6 to 8 show the case in which a route is set in the user's consideration of additional conditions together with the user information registered in the user registration database S3d of the route setting site S3 when the user input additional conditions such as a time, a time zone, a date or a weather to set the route.

In other words, FIG. 6 shows an example in which the user inputs PM 0:00 to 1:00 for a time zone in which the route is passed.

In this example, the route setting server S3a decides that the input time zone is taken for a meal, thereby picking up an eating house between the starting point S and the destination G which is specified from eating houses such as a restaurant which are registered on the advertisement provider database S3c.

Then, if the route setting server S3a further decides that the user is elderly based on the age recorded in the user information of the user registration database S3d when picking up the eating house, it picks up a Japanese restaurant e from the eating houses and a route L3 passing therethrough is determined as a set route.

FIGS. 7 and 8 show an example in which a time for utilization, a time zone and a date which are related to the route are input as additional conditions or a weather during the utilization is input.

In this example, the route setting server 3a sets a route based on weather information such as a weather or a climate which is acquired from the route setting site S3 or other systems or sites or weather conditions input by the user on the basis of the input time, time zone and date.

For example, if the weather in the weather information is rain, a route L4 passing through a shopping district to be an advertisement provider having an arcade g, and furthermore, passing through a convenience store h selling an umbrella is set such that the user can walk without getting wet in the rain as shown in FIG. 7.

Moreover, in the case in which the weather in the weather information is rain or fair in the midsummer, a route L5 passing through a large store j such as a department store or a supermarket having entrances and exits j1 and j2 facing different roads which is an advertisement provider such that the user can keep out of the rain or pass through a route with high air conditioning as shown in FIG. 8.

Such a route L5 passing through the large store j can be set by storing data on the positions of the entrances and exits of the large store to be the advertisement provider in the route database S3b of the route setting site S3, respectively.

Figure 9:
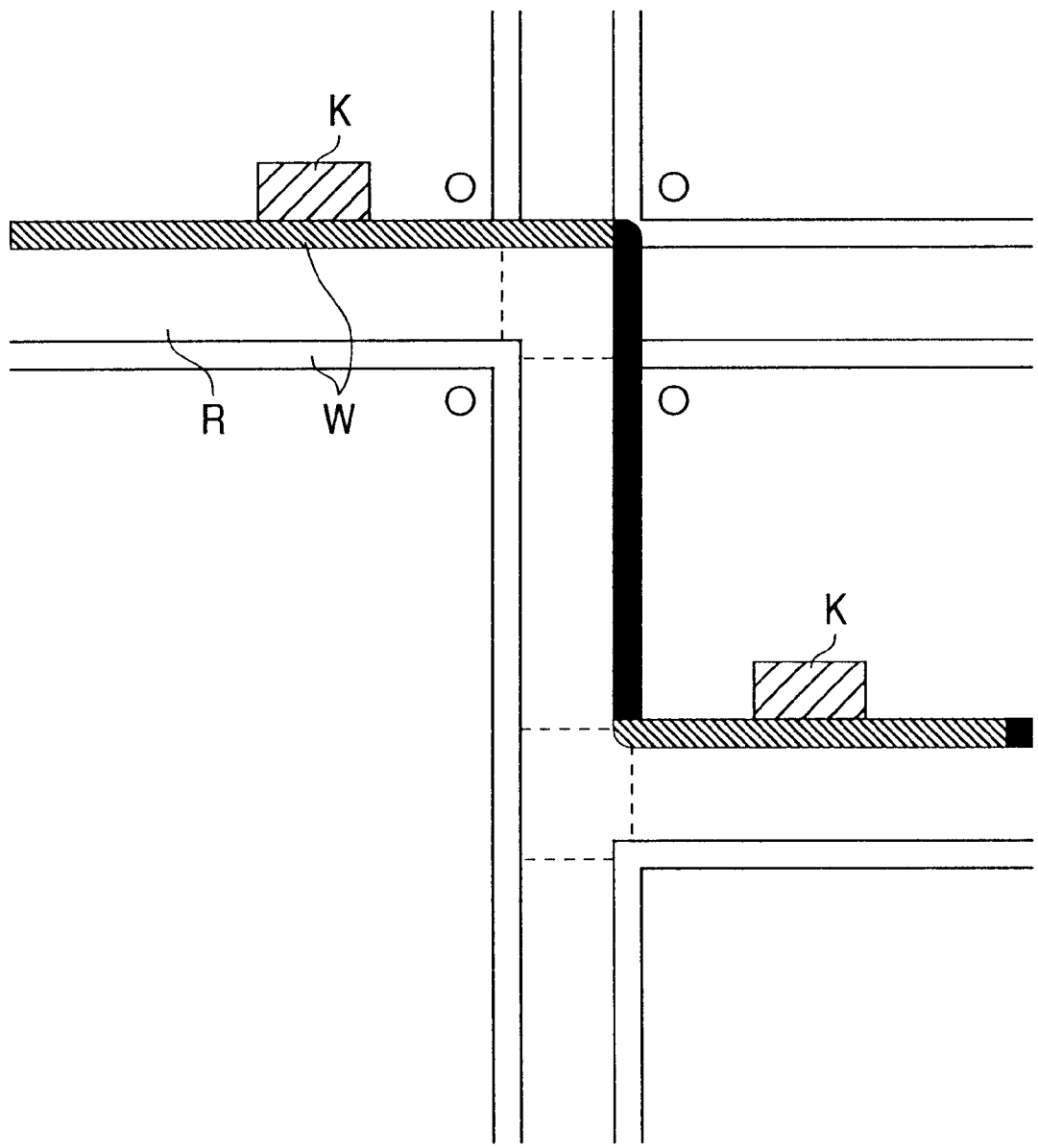
FIG. 9 is a diagram illustrating a further example of the screen displaying the result of the route setting according to the invention.
Figure 10:
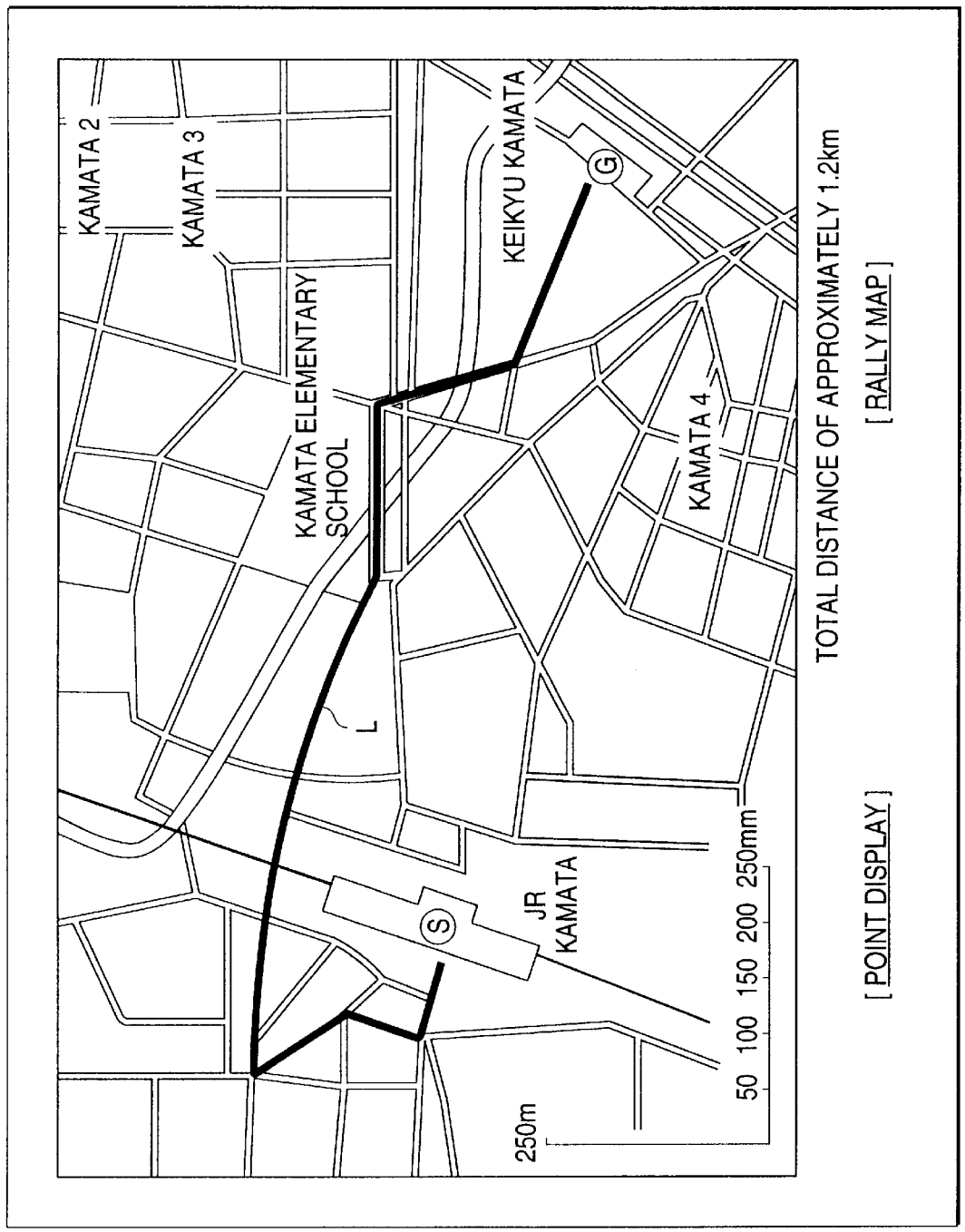
FIG. 10 is a diagram illustrating a screen displaying a result of route setting through a conventional man navigation system.

In the route setting manner, if the store of the advertisement provider picked up during the route setting faces one of sidewalk sides on a large road, one of sidewalks w on both sides of a road R where a picked-up store k is located is set as a route as shown in FIG. 9 through the storage of data on the identification of right and left sidewalks provided on a road, a signal on an intersection and the position of a crosswalk in the route database S3b of the route setting site S3 as described above.

When the data on the route set in the route setting site S3 as described above are transmitted to the terminal equipment T and the set route is displayed on the map image, a store corresponding to the user information or the additional conditions is enlarged, is differently colored or flashed for the display or only main facilities such as a station or an institution and a store corresponding to the user information or the additional conditions are displayed on the map image so that the store can be distinguished from other stores.

Moreover, in the case in which the user is to specify the same two points again to set a route, he (she) can get an opportunity for a new discovery related to area information if a route different from the set route is set.

While description has been given to the case in which the starting point and the destination are specified on a home page for providing the map information during the route setting and the map image and the set route are acquired in the terminal equipment T at the same time, it is also possible to display a map image in a desirable area on the terminal equipment T and to specify a starting point and a destination and input route setting conditions on the displayed map image.

Moreover, if the there is no advertisement provider database, it is also possible to select facilities corresponding to user information and additional information from related information registered for facilities displayed on a map and to set a route.

Furthermore, while description has been given to the case in which the user information about the route setting is previously registered in the advertisement provider database S3c, it is also possible to input all user information during a route setting operation in the terminal equipment T.

What is claimed is:

1. A man navigation system comprising:

map display means for retrieving map data on a required area from a database and displaying a map image based on the retrieved map data;

point specifying means for optionally specifying a first point and a second point in the map image displayed by said map display means;

condition setting means for setting a condition for route setting;

route setting means for setting a route connecting the first point and the second point in the map image specified by said point specifying means based on the condition set by said condition setting means;

route display means for displaying the route set by said route setting means on the map image displayed by said map display means;

a user registration database containing user information relating to a user; and a facility information database containing information relating to facilities in the map image, wherein said condition setting means evaluates the user information stored in the user registration database and sets said condition based on said user information, and wherein the route setting means evaluates said condition, determines particular facilities in said facility information database that correspond to said user information based on said condition, and sets said route based on the particular facilities.

2. The man navigation system according to claim 1, wherein said user information includes at least one of a user's sex, age, and hobby.

3. A man navigation system, comprising:

map display means for retrieving map data on a required area from a database and displaying a map image based on the retrieved map data;

point specifying means for optionally specifying a first point and a second point in the map image displayed by said map display means;

condition setting means for setting a condition for route setting;

route setting means for setting a route connecting the first point and the second point in the map image specified by said point specifying means based on the condition set by said condition setting means;

route display means for displaying the route set by said route setting means on the map image displayed by said map display means, wherein said condition setting means sets said route setting condition based on user information including at least one of a user's sex, age, and hobby, and wherein the user information is previously recorded in a user registration database and said condition setting means sets the route setting condition by reading the user information from the user registration database.

4. The man navigation system according to claim 1, wherein said condition setting means sets, as the route setting condition, at least one condition selected from a time that the user intends to utilize the route, a weather, a season, and a climate.

5. A man navigation system, comprising:

map display means for retrieving map data on a required area from a database and displaying a map image based on the retrieved map data;

point specifying means for optionally specifying a first point and a second point in the map image displayed by said map display means;

condition setting means for setting a condition for route setting;

route setting means for setting a route connecting the first point and the second point in the map image specified by said point specifying means based on the condition set by said condition setting means;

route display means for displaying the route set by said route setting means on the map image displayed by said map display means, wherein said condition setting means sets said route setting condition based on user information including at least one of a user's sex, age, and hobby, and wherein said route setting means has a facility information database storing information about facilities positioned in the map image displayed by said map display means, retrieves the facilities corresponding to the user information from the facility information database, and selects a route including the retrieved facilities as the set route.

6. The man navigation system according to claim 4, wherein said route setting means retrieves, from the facility information database, the facilities corresponding to at least one condition selected from the time, the weather, the season or the climate which is set as the route setting condition by said condition setting means, and selects a route including the retrieved facilities as the set route.

7. The man navigation system according to claim 5, wherein the facility information stored in the facility information database is recorded based on a request of an advertisement provider.

8. The man navigation system according to claim 1, wherein said route setting means has a route database storing information about a route on the map image displayed by said map display means and sets a route based on the route information retrieved from the route database.

9. The man navigation system according to claim 8, wherein the route information stored in the route database is related to presence of an arcade.

10. The man navigation system according to claim 8, wherein the route information stored in the route database is related to positions of entrances and exits of public buildings.

11. A man navigation system, comprising:

map display means for retrieving map data on a required area from a database and displaying a map image based on the retrieved map data;

point specifying means for optionally specifying a first point and a second point in the map image displayed by said map display means;

condition setting means for setting a condition for route setting; route setting means for setting a route connecting the first point and the second point in the map image specified by said point specifying means based on the condition set by said condition setting means;

route display means for displaying the route set by said route setting means on the map image displayed by said map display means, wherein said route setting means has a route database storing information about a route on the map image displayed by said map display means and sets a route based on the route information retrieved from the route database, and wherein the route information stored in the route database is related to a position of a sidewalk provided on both sides of a road.

12. A man navigation system, comprising:

map display means for retrieving map data on a required area from a database and displaying a map image based on the retrieved map data;

point specifying means for optionally specifying a first point and a second point in the map image displayed by said map display means;

condition setting means for setting a condition for route setting;

route setting means for setting a route connecting the first point and the second point in the map image specified by said point specifying means based on the condition set by said condition setting means;

route display means for displaying the route set by said route setting means on the map image displayed by said map display means, wherein said route setting means has a route database storing information about a route on the map image displayed by said map display means and sets a route based on the route information retrieved from the route database, and wherein the route information stored in the route database is related to a position of a crosswalk provided on a road.

13. The man navigation system according to claim 5, wherein said route display means displays the facilities retrieved from the facility information database to be distinguished from other facilities on the map image displayed by said map display means.

14. The man navigation system according to claim 6, wherein the facility information stored in the facility information database is recorded based on a request of an advertisement provider.

15. The man navigation system according to claim 6, wherein said route display means displays the facilities retrieved from the facility information database to be distinguished from other facilities on the map image displayed by said map display means.

16. A method of retrieving a route through a man navigation system including a map information providing site, a map database site, and a route setting site, comprising:

in said map information providing site,
receiving starting and destination points from a terminal;
transmitting position information of the staring and destination points in said map information site, and URLs of said map database site and of said route setting site to said terminal;

in said map database site,
receiving the position information from said terminal;
transmitting map data of an area corresponding to the position information to said terminal;

in said route setting site,
receiving the position information from said terminal;
obtaining user information from a user database;
obtaining advertisement information from an advertisement database based on the user information;
retrieving a route on based on the position information, the user information, and the advertisement information; and
transmitting route information to said terminal.

17. A man navigation system, comprising:

map display means for retrieving map data on a required area from a database and displaying a map image based on the retrieved map data;

point specifying means for optionally specifying a first point and a second point in the map image displayed by said map display means;

condition setting means for setting a condition for route setting;

route setting means for setting a route connecting the first point and the second point in the map image specified by said point specifying means based on the condition set by said condition setting means;

route display means for displaying the route set by said route setting means on the map image displayed by said map display means, wherein user information is previously recorded in a user registration database and said condition setting means sets the route setting condition by reading the user information from the user registration database.

18. A man navigation system, comprising:

a display;

a user registration database;

a controller that retrieves map data corresponding to particular area from a database and instructs said display to display a map image based on the retrieved map data, an input device that specifies at least one of a first point and a second point in the map image displayed on the display, wherein the controller determines a route setting condition and determines a route connecting the first point and the second point in the map image based on the route setting condition, wherein the controller instructs said display to display the route on the display map image, and wherein user information is previously recorded in said user registration database and said controller sets the route setting condition based on the user information stored in the user registration database.

* * * * *